United States Patent
Kito et al.

(10) Patent No.: US 9,783,048 B2
(45) Date of Patent: Oct. 10, 2017

(54) FUEL SUPPLY SYSTEM

(71) Applicant: TOYODA GOSEI CO., LTD., Kiyosu-shi, Aichen-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 302 days.

(21) Appl. No.: 14/610,083

(22) Filed: Jan. 30, 2015

(65) Prior Publication Data

US 2015/0239340 A1 Aug. 27, 2015

(30) Foreign Application Priority Data

Feb. 21, 2014 (JP) .................................. 2014-031733

(51) Int. Cl.
*B60K 15/04* (2006.01)
*B60K 15/03* (2006.01)

(52) U.S. Cl.
CPC .......... *B60K 15/0406* (2013.01); *B60K 15/04* (2013.01); *B60K 2015/03401* (2013.01); *B60K 2015/0432* (2013.01)

(58) Field of Classification Search
USPC ................................ 138/137, 140, 141, 96 R
See application file for complete search history.

(56) References Cited

U.S. PATENT DOCUMENTS

| 6,170,535 | B1 | 1/2001 | Sadr et al. |
| 6,880,593 | B1 * | 4/2005 | Swane .............. B29C 66/73921 |
| | | | 141/286 |
| 8,383,219 | B2 * | 2/2013 | Schmidt .................... B32B 3/08 |
| | | | 361/212 |
| 2006/0113696 | A1 * | 6/2006 | Aisenbrey ........... B29C 47/0004 |
| | | | 264/104 |

FOREIGN PATENT DOCUMENTS

| CN | 102180433 A | 9/2011 |
| JP | H7-027224 Y2 | 6/1995 |
| JP | H09-068126 A | 3/1997 |
| JP | 2011-131824 A | 7/2011 |

* cited by examiner

*Primary Examiner* — Craig Schneider
*Assistant Examiner* — David Deal
(74) *Attorney, Agent, or Firm* — Posz Law Group, PLC

(57) ABSTRACT

A fuel supply system provided comprises: a resin filler neck configured to have an opening which a fuel nozzle is inserted through and have a multi-layered structure of a conductive layer of electrical conductivity and a non-conductive layer of non-electrical conductivity; a resin fuel pipe connected with the filler neck and configured to have a multi-layered structure including a conductive outer layer of electrical conductivity provided as an outermost layer; and a cap member of electrical conductivity configured to open or close the opening of the filler neck. The filler neck includes a cap member contact part of electrical conductivity arranged to come into contact with the cap member and a conductive outer layer contact part of electrical conductivity arranged to come into contact with the conductive outer (Continued)

layer of the fuel pipe, so as to form a conductive path from the cap member to the conductive outer layer of the fuel pipe.

6 Claims, 4 Drawing Sheets

FUEL SUPPLY SYSTEM

CROSS-REFERENCE TO RELATED APPLICATIONS

This application claims priorities to Japanese Patent Application No. 2014-31733 filed on Feb. 21, 2014, entire disclosure of which is incorporated herein by reference for all purposes.

BACKGROUND

The invention relates to a fuel supply system configured to supply fuel to a fuel tank of, for example, an automobile.

A known mechanism for a fuel supply system supplies fuel to a fuel tank through a resin fuel pipe connected with a filler neck. In such a fuel supply system, there is a need to provide a grounding path for grounding the static electricity transferred from the person having accumulated static electricity through a cap member and a filler neck. For example, in a fuel supply system described in Japanese Patent Publication (JP 2011-131824A), in a state that a fuel pipe of a double-layered structure including an outer layer made of a conductive resin is press fit into the outer circumference of a filler neck made of a conductive resin, a grounding connection part of the filler neck comes into contact with the outer layer of the fuel pipe, so as to provide a grounding path from the outer layer of the fuel pipe through a metal pipe holding unit to a vehicle body.

SUMMARY

In terms of improvement of fuel permeation resistance and impact resistance, the filler neck itself has been examined to have a double-layered structure of a resin having fuel permeation resistance and a resin having impact resistance. A conductive material should be added to a resin, in order to provide the resin with electrical conductivity. Adding the conductive material to both the two layers, however, increases the cost. It is accordingly preferable to provide only one of the two layers with the electrical conductivity. In the case that only one of the two layers is provided with the electrical conductivity, however, there is a difficulty in ensuring the grounding path formed through the cap member, the filler neck and the fuel pipe. This problem is commonly found in the filler neck and the fuel pipe having the double-layered structure or any other multi-layered structure.

Accordingly, there is a need for a fuel supply device using a filler neck of a multi-layered structure and a fuel pipe of a multi-layered structure to provide a grounding path.

The invention may be implemented by any of the following aspects, in order to solve at least part of the above problems.

According to a first aspect, there is provided a fuel supply system configured to supply fuel ejected from a fuel nozzle to a fuel tank. The fuel supply system of the first aspect comprises: a resin filler neck configured to have an opening which a fuel nozzle is inserted through and have a multi-layered structure of a conductive layer of electrical conductivity and a non-conductive layer of non-electrical conductivity; a resin fuel pipe connected with the filler neck and configured to have a multi-layered structure including a conductive outer layer of electrical conductivity provided as an outermost layer; and a cap member of electrical conductivity configured to open or close the opening of the filler neck. The filler neck includes a cap member contact part of electrical conductivity arranged to come into contact with the cap member and a conductive outer layer contact part of electrical conductivity arranged to come into contact with the conductive outer layer of the fuel pipe, so as to form a conductive path from the cap member to the conductive outer layer of the fuel pipe.

In the fuel supply system of the first aspect, the cap member, the filler neck and the fuel pipe are electrically connected, so as to provide the grounding path through the outer layer of the fuel pipe.

In the fuel supply system of the first aspect, the filler neck may have the conductive layer provided as an innermost layer, and the conductive outer layer contact part may be formed from the conductive layer to pass through the non-conductive layer. In the configuration that the conductive layer of the filler neck is located on the innermost layer and the other layer is non-conductive, the cap member, the filler neck and the fuel pipe are electrically connected via the conductive outer layer contact part, so as to provide the grounding path through the outer layer of the fuel pipe.

In the fuel supply system of the first aspect, the filler neck may have the conductive layer provided as an outermost layer, and the cap member contact part may be formed from the conductive layer to pass through the non-conductive layer. In the configuration that the conductive layer of the filler neck is located on the outermost layer, the cap member, the filler neck and the fuel pipe are electrically connected via the cap member contact part, so as to provide the grounding path through the outer layer of the fuel pipe.

The invention may be implemented by any of various other aspects: for example, a filler neck, an apparatus including the fuel supply system, a moving body including the fuel supply system, an automobile including the fuel supply system and a manufacturing method of the fuel supply system.

DETAILED DESCRIPTION

A. First Embodiment

(A1) Configuration of Fuel Supply System

Figure 1:
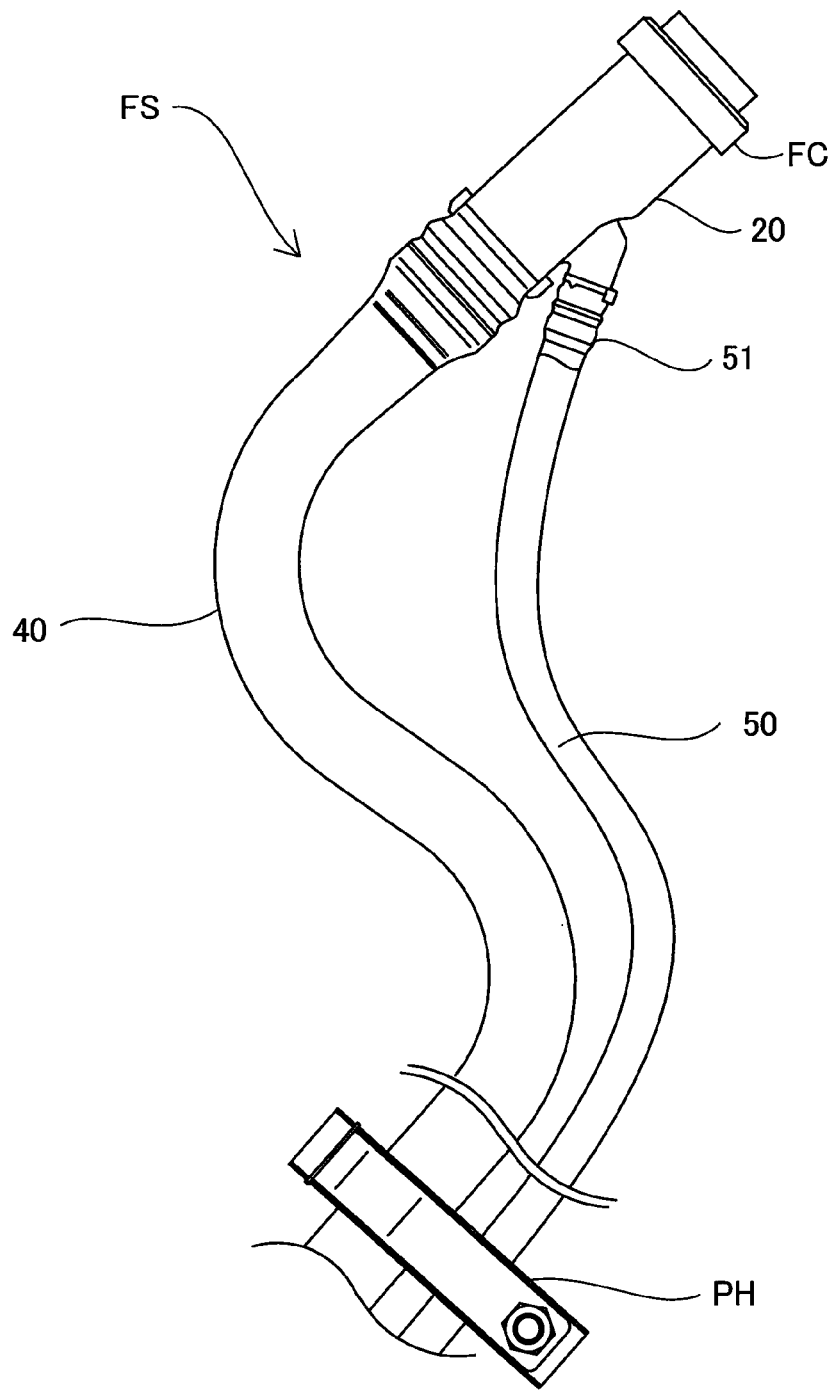
FIG. 1 is a diagram illustrating the general configuration of a fuel supply system according to a first embodiment of the invention.

FIG. 1 is a diagram illustrating the general configuration of a fuel supply system FS according to a first embodiment of the invention. The fuel supply system FS is used for fuel supply to a fuel tank of an automobile and includes a fuel cap FC, a filler neck 20, fuel pipes 40 and 50, a pipe holding unit PH and tank connecting members (not shown). The filler neck 20 and the fuel pipe 40 form a fuel supply passage. The pipe holding unit PH is provided to attach the fuel pipes 40 and 50 to a vehicle body-side member (not shown). The tank connecting members are provided to connect the respective ends of the fuel pipes 40 and 50 to the fuel tank.

Figure 2:
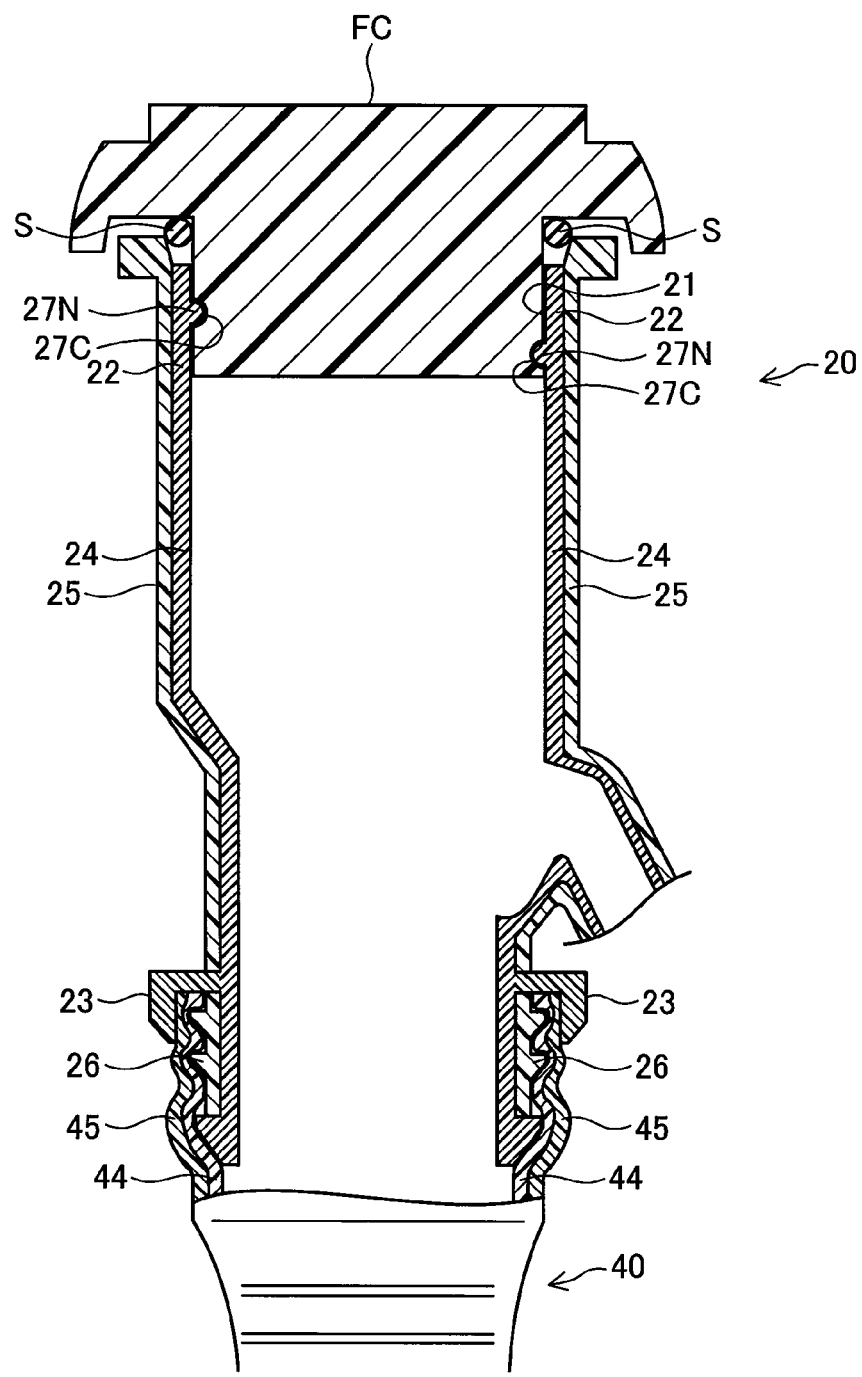
FIG. 2 is a diagram schematically illustrating the cross sectional structure of a filler neck and part of a fuel pipe of the first embodiment.

The fuel pipe 40 is a resin pipe arranged to connect the filler neck 20 with the fuel tank and has one end connected with the filler neck 20 and the other end connected with the fuel tank. The fuel pipe 40 has double-layered structure of an inner layer 44 and an outer layer 45 as shown in FIG. 2. The inner layer 44 is made of polyethylene having excellent fuel permeation resistance, while the outer layer 45 is made of polyethylene having electrical conductivity provided by addition of carbon black. The double-layered structure of the fuel pipe 40 meets the requirements of fuel permeation resistance and electrical conductivity. Providing the electrical conductivity to only the outer layer 45 ensures a grounding path described later, while suppressing an increase in cost.

The additive used to provide the electrical conductivity is not limited to carbon black but may be carbon such as carbon filler or graphite, a metal such as silver or copper, or a metal compound such as tin oxide or indium oxide. The resin material used is not limited to polyethylene but may be any of various resin materials such as polycarbonate, polypropylene or polystyrene. Specifically, nylon or EVOH (ethylene vinyl alcohol copolymer resin) may be used as the resin material having excellent fuel permeation resistance. Any of various additional components such as rubber or silicone may be added to the material used to form the inner layer or the outer layer by taking into account the fuel permeation resistance, the impact resistance, the durability, the cost and the weight.

The fuel cap FC is made of a resin material having electrical conductivity. As shown in FIG. 2, the fuel cap FC has a threaded part 27C which is screwed to a threaded part 27N formed on a fuel cap contact part 22. The fuel cap FC is mounted to the filler neck 20 via a rubber sealing material S. The fuel cap FC is, however, not limited to this configuration but may have any configuration suitable to selectively open or close an opening 21 of the filler neck 20. For example, the fuel cap FC may have a configuration using a valve element such as a flap valve to open and close the opening (generally called capless configuration).

For fueling, the fuel cap FC is removed from the filler neck 20, a fuel gun (not shown) is inserted through the opening 21, and fuel is injected from the fuel gun into the filler neck 20. The fuel is then supplied through the fuel supply passage to the fuel tank. The fuel pipe 40 works as part of the grounding path for grounding static electricity accumulated in the human body or the like during fueling as described later.

The fuel pipe 50 is a breather pipe arranged to circulate the fuel vapor in the fuel tank to the fuel pipe 40 during fueling. Similarly to the fuel pipe 40, the fuel pipe 50 has one end connected with the filler neck 20 and the other end connected with the fuel tank. The fuel pipe 50 is made of polyethylene having excellent fuel permeation resistance. The fuel pipe 50 may also have a double-layered structure, like the fuel pipe 40.

In the course of supplying the fuel from the fuel gun through the fuel supply passage to the fuel tank, the fuel pipe 50 works to release the fuel vapor in the fuel tank out of the fuel tank and reduce the internal pressure of the fuel tank, thus ensuring smooth fuel supply.

(A2) Structure of Filler Neck

FIG. 2 is a diagram schematically illustrating the cross sectional structure of the filler neck 20 and part of the fuel pipe 40. The filler neck 20 is formed in an approximately tubular shape and has an opening 21 which the fuel cap FC is fit in, at one end and a pipe connecting member 26 which the fuel pipe 40 is connected with, at the other end. The fuller neck 20 also has a branched pipe connecting member (not shown) which the fuel pipe 50 is connected with.

The filler neck 20 has a double-layered structure of an inner layer 24 and an outer layer 25. The inner layer 24 is made of nylon having excellent fuel permeation resistance and electrical conductivity provided by addition of carbon black, while the outer layer 25 is made of polyethylene having high impact resistance. The double-layered structure of the filler neck 20 meets requirements of fuel permeation resistance and impact resistance. Providing the electrical conductivity to only the inner layer 24 ensures a grounding path described later, while suppressing an increase in cost. According to this embodiment, the electrical resistance of the conductive resin forming the inner layer 24 is $10^{-6}$ to $10^{-9}$ Ω·m.

The electrical resistance of the conductive resin is, however, not limited to the above range but may be any electrical resistance adequately providing the electrical conductivity. The additive use to provide the electrical conductivity is not limited to carbon black but may be carbon such as carbon filler or graphite, a metal such as silver or copper, or a metal compound such as tin oxide or indium oxide. The resin material used is not limited to nylon or polyethylene but may be any of various resin materials such as polycarbonate, polypropylene or polystyrene. Any of various additional components such as rubber or silicone may be added to the material used to form the inner layer or the outer layer by taking into account the fuel permeation resistance, the impact resistance, the durability, the cost and the weight.

The filler neck 20 includes a fuel cap contact part 22 configured to come into contact with the fuel cap F and conductive outer layer contact parts 23 configured to come into contact with the conductive outer layer 45 of the fuel pipe 40. The fuel cap contact part 22 comes into contact with the fuel cap FC when the fuel cap FC is mounted to the filler neck 20. The fuel cap contact part 22 is provided as part of the inner layer 24. In other words, the fuel cap contact part 22 is provided as part of the inner layer 24 on the inner circumference of the outer layer 25 and comes into contact with the fuel cap FC.

When the fuel cap FC is mounted to the filler neck 20 and the fuel cap contact part 22 comes into contact with the fuel cap FC, the fuel cap FC and the filler neck 20 are electrically connected with each other. The fuel cap contact part 22 is not limited to this configuration but may have any configuration that comes into contact with the conductive inner layer 24 and the conductive fuel cap FC and ensures a conductive path from the fuel cap FC to the inner layer 24. For example, the fuel cap contact part 22 may be extended in the form of a slit from the inner layer 24 or may be extended in the form of a small piece from the inner layer 24 to partly come into contact with the fuel cap FC.

The conductive outer layer contact parts 23 are made of the same conductive resin material as the resin material of the inner layer 24 and are formed integrally with the inner layer 24 by injection molding. The conductive outer layer contact parts 23 are protruded radially outward from the inner layer 24 of an approximately tubular shape to pass through the outer layer 25 and to be formed in a hook-like shape. According to this embodiment, two conductive outer layer contact parts 23 are provided at symmetrical positions on the outer circumference of the filler neck 20.

The pipe connecting member 26 of the filler neck 20 is formed in a fir tree shape having a plurality of projections protruded radially outward to be formed in an annular shape and have a cross section of approximately right triangle. The fir tree shape of the pipe connecting member 26 expands a connection end of the fuel pipe 40 to facilitate insertion of the fuel pipe 40 during press fitting the fuel pipe 40 to the filler neck 20, while preventing or suppressing detachment of the fuel pipe 40 from the filler neck 20 even under application of a force in the pull-out direction of the fuel pipe 40.

A gap between the outer circumferential surface of the pipe connecting member 26 and the inner surfaces of the conductive outer layer contact parts 23 is made smaller than the wall thickness of the fuel pipe 40. As illustrated, when the fuel pipe 40 is connected with the filler neck 20, the connection end of the fuel pipe 40 is placed between the pipe connecting member 26 and the conductive outer layer contact parts 23, and the conductive outer layer contact parts 23 bite into and come into contact with the conductive outer layer 45 of the fuel pipe 40. More specifically, the fir tree shape of the pipe connecting member 26 presses the connection end of the fuel pipe 40 radially outward, so that the filler neck 20 and the fuel pipe 40 are electrically connected with each other.

The number and the shape of the conductive outer layer contact parts 23 are not limited to those of this embodiment, but may be any number and any shape that cause the conductive outer layer contact part 23 to come into contact with the conductive inner layer 24 of the filler neck 20 and the conductive outer layer 45 of the fuel pipe 40 and ensure the conductive path from the filler neck 20 to the fuel pipe 40. For example, only one conductive outer layer contact part 23 may be provided, or three or more conductive outer layer contact parts 23 may be provided.

In the fuel supply system FS of the first embodiment, the conductive outer layer contact parts 23 of the filler neck 20 are arranged to pass through the non-conductive outer layer 25 and come into contact with the conductive outer layer 45 of the fuel pipe 40. Irrespective of the non-conductive outer layer 25 of the filler neck 20, this configuration causes the filler neck 20 and the fuel pipe 40 to be electrically connected with each other. Accordingly, the fuel supply system FS of the first embodiment provides the grounding path from the fuel cap FC through the fuel cap contact part 22, the inner layer 24 and the conductive outer layer contact parts 23 of the filler neck 20, the conductive outer layer 45 of the fuel pipe 40 and the pipe holding unit PH to the vehicle body-side member. In the case of fueling with opening the fuel cap FC, the static electricity accumulated in, for example, the human body is quickly removed through the grounding path provided in the fuel supply system FS of the first embodiment.

In the fuel supply system FS of the first embodiment, when the fuel pipe 40 is connected with the filler neck 20, the connection end of the fuel pipe 40 is placed between the pipe connecting member 26 and the conductive outer layer contact parts 23. The conductive outer layer contact parts 23 bite into and come into contact with the conductive outer layer 45 of the fuel pipe 40. This configuration increases the contact area and securely forms the electrical connection.

The fuel pipe 40 is used as part of the grounding path. There is accordingly no need to separately provide a grounding wire from the filler neck 20 to the vehicle body-side member. This simplifies the configuration of the fuel supply system FS and facilitates the connecting operation.

B. Second Embodiment (B1) Structure of Filler Neck

Figure 3:
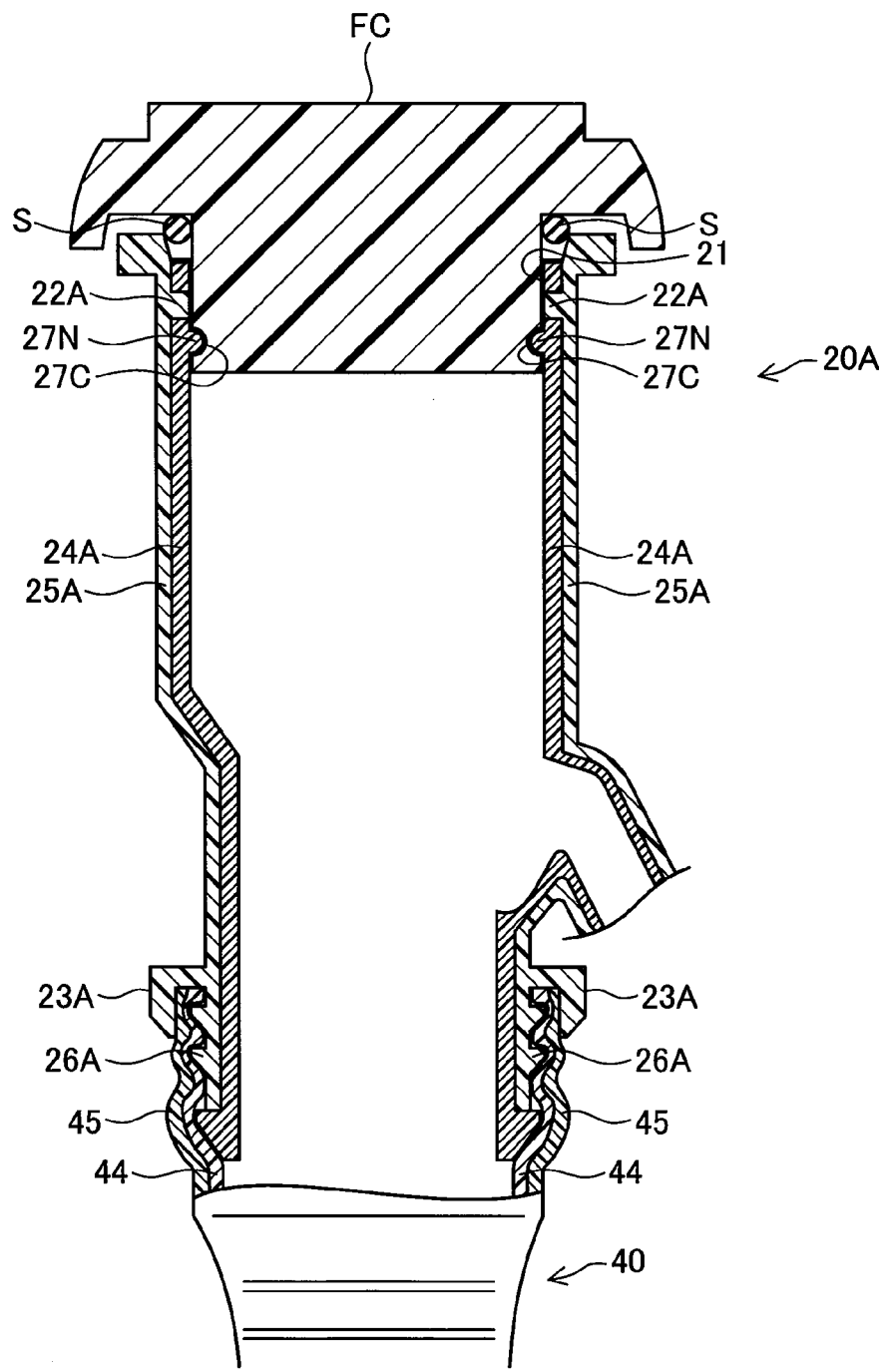
FIG. 3 is a diagram schematically illustrating the cross sectional structure of a filler neck and part of a fuel pipe in a fuel supply system according to a second embodiment.

FIG. 3 is a diagram schematically illustrating the cross sectional structure of a filler neck 20A and part of a fuel pipe 40 in a fuel supply system FS according to a second embodiment. The fuel supply system FS of the second embodiment differs from the fuel supply system FS of the first embodiment by the structure of the filler neck but otherwise has the similar configuration. The like components are expressed by the like symbols and are not specifically described herein.

The filler neck 20A of the second embodiment has a double-layered structure like the filler neck 20 of the first embodiment but has a conductive outer layer 25A made of a conductive resin and a non-conductive inner layer 24A unlike the filler neck 20 of the first embodiment. Like the filler neck 20 of the first embodiment, the filler neck 20A has fuel cap contact parts 22A arranged to come into contact with the fuel cap FC and conductive outer layer contact parts 23A arranged to come into contact with the conductive outer layer 45 of the fuel pipe 40.

The fuel cap contact parts 22A are made of the same conductive resin material as the resin material of the outer layer 25A and are formed integrally with the outer layer 25A by injection molding. The fuel cap contact parts 22A are protruded radially inward from the outer layer 25A of an approximately tubular shape to pass through the inner layer 24A and to be formed in a columnar shape (formed as projections). When the fuel cap FC is mounted to the filler neck 20A and the fuel cap contact parts 22A come into contact with the fuel cap FC, the fuel cap FC and the filler neck 20A are electrically connected with each other.

According to this embodiment, two fuel cap contact parts 22A are provided at symmetrical positions on the inner circumference of the filler neck 20A. The number and the shape of the fuel cap contact parts 22A are not limited to those of this embodiment, but may be any number and any shape that cause the fuel cap contact parts 22A to come into contact with the conductive outer layer 25A and the conductive fuel cap FC and ensure the conductive path from the fuel cap FC to the outer layer 25A. For example, only one fuel cap contact part 22A may be provided, or three or more fuel cap contact parts 22A may be provided. In another example, the fuel cap contact part 22A may be formed in an annular shape around the entire circumference.

The conductive outer layer contact parts 23A are made of the same conductive resin material as the resin material of the outer layer 25A and are formed integrally with the outer layer 25A by injection molding. The conductive outer layer contact parts 23A are protruded radially outward from the outer layer 25A of an approximately tubular shape to be formed in a hook-like shape. According to this embodiment, two conductive outer layer contact parts 23A are provided at symmetrical positions on the outer circumference of the filler neck 20A, like the first embodiment.

As illustrated, when the fuel pipe 40 is connected with the filler neck 20A, the connection end of the fuel pipe 40 is placed between the pipe connecting member 26 and the conductive outer layer contact parts 23A, and the conductive outer layer contact parts 23A bite into and come into contact with the conductive outer layer 45 of the fuel pipe, like the first embodiment. This causes the filler neck 20A and the fuel pipe 40 to be electrically connected with each other.

The number and the shape of the conductive outer layer contact parts 23A are not limited to those of this embodiment but may be any number and any shape that come into contact with the conductive outer layer 25A of the fuller neck 20A and the conductive outer layer 45 of the fuel pipe 40 and ensure the conductive path from the filler neck 20A to the fuel pipe 40. For example, only one conductive outer layer contact part 23A may be provided, or three or more conductive outer layer contact parts 23A may be provided.

In the fuel supply system FS of the second embodiment, the fuel cap contact parts 22A of the filler neck 20A are arranged to pass through the non-conductive inner layer 24A and come into contact with the fuel cap FC. Irrespective of the non-conductive inner layer 24A of the filler neck 20A, this configuration causes the fuel cap FC and the filler neck 20 to be electrically connected with each other. Accordingly, the fuel supply system FS of the second embodiment provides the grounding path from the fuel cap FC through the fuel cap contact parts 22A, the outer layer 25A and the conductive outer layer contact parts 23A of the filler neck 20A, the conductive outer layer 45 of the fuel pipe 40 and the pipe holding unit PH to the vehicle body-side member. In the case of fueling with opening the fuel cap FC, the static electricity accumulated in, for example, the human body is quickly removed through the grounding path provided in the fuel supply system FS of the second embodiment.

C. Modifications

The invention is not limited to the embodiments described above but may be implemented by a diversity of other configurations without departing from the scope of the invention. For example, the technical features of the embodiments corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

Some examples of possible modification are given below.

(C1) Modification 1

Figure 4:
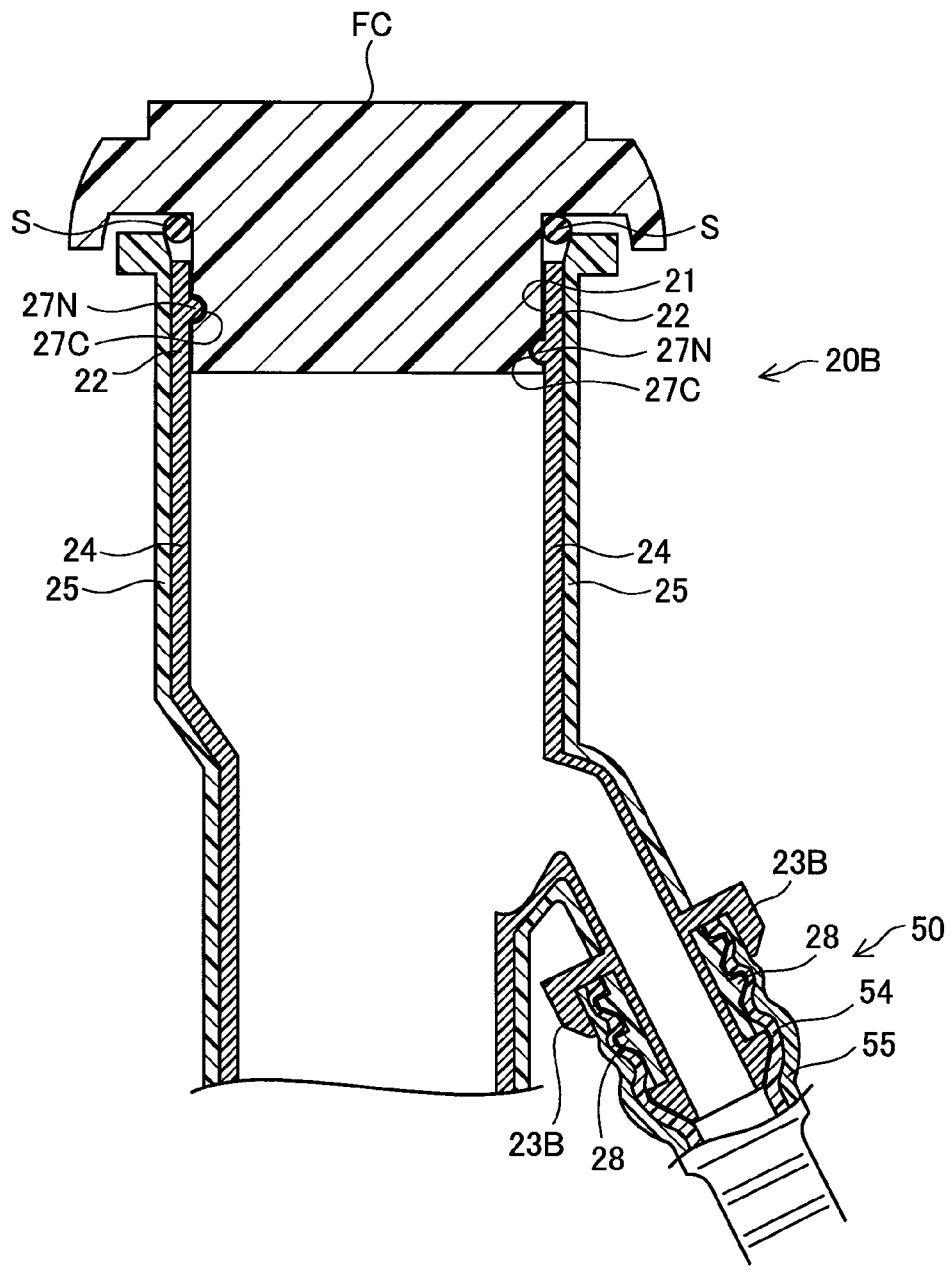
FIG. 4 is a diagram schematically illustrating the cross sectional structure of a filler neck and part of a fuel pipe in a fuel supply system according to a modification.

In the above embodiment, the grounding path is formed in the fuel pipe 40 for fuel supply. This is, however, not restrictive, and the grounding path may alternatively be formed in the breather fuel pipe 50. FIG. 4 is a diagram schematically illustrating the cross sectional structure of a filler neck 20B and part of the fuel pipe 50 in a fuel supply system according to a modification. As shown in FIG. 4, the filler neck 20B of the modification differs from the filler neck 20 of the first embodiment by conductive outer layer contact parts 23B provided instead of the conductive outer layer contact parts 23. The conductive outer layer contact parts 23B are provided on a pipe connecting member 28 which the fuel pipe 50 is connected with. Like the conductive outer layer contact parts 23 of the first embodiment, the conductive outer layer contact parts 23B are integrally formed with the inner layer 24 by injection molding and are protruded radially outward from the inner layer 24 of the substantially tubular shape to pass through the outer layer 25 and to be formed in a hook-like shape. In the fuel supply system of the modification, like the fuel pipe 40 of the first embodiment, the fuel pipe 50 has a double-layered structure of a non-conductive inner layer 54 and a conductive outer layer 55 made of a conductive resin. This provides the grounding path from the fuel cap FC through the fuel cap contact part 22, the inner layer 24 and the conductive outer layer contact parts 23B of the filler neck 20B, the conductive outer layer 55 of the fuel pipe 50 and the pipe holding unit PH to the vehicle body-side member. Furthermore, the grounding path may be provided in both the fuel pipe 40 and the fuel pipe 50.

(C2) Modification 2

The first embodiment describes the conductive outer layer contact parts 23 formed integrally with the inner layer 24 by injection molding, and the second embodiment describes the fuel cap contact parts 22A and the conductive outer layer contact parts 23A formed integrally with the outer layer 25A. The method of forming these parts is, however, not limited to these embodiments, but any other molding technique such as blow molding, thermoforming or compression molding may be employed for the forming method. The fuel cap contact part(s) 22 or 22A and the conductive outer layer contact parts 23 or 23A may be formed as separate parts from the inner layer and the outer layer and may be bonded to the inner layer or the outer layer by an adhesive or by thermal welding. In this modification, the fuel cap contact part(s) 22 or 22A and the conductive outer layer contact parts 23 or 23A may be made of a different material from the materials of the inner layer and the outer layer.

(C3) Modification 3

In the embodiments described above, the filler neck 20 or 20A and the fuel pipe 40 have the double-layered structure. Any of the filler neck 20 or 20A and the fuel pipe 40 may have three- or more-layered structure. In this modification having the three- or more-layered structures of the filler neck and the fuel pipe, the fuel cap contact parts and the conductive outer layer contact parts should be formed appropriately according to the arrangement of the layer having electrical conductivity, in order to provide a grounding path from the fuel cap FC through the filler neck and the fuel pipe.

(C4) Modification 4

In the embodiment described above, the gap between the outer circumferential surface of the pipe connecting member 26 of the filler neck 20 and the inner surfaces of the conductive outer layer contact parts 23 is made smaller than the wall thickness of the fuel pipe 40. The gap may, however, be equal to or smaller than the wall thickness of the fuel pipe 40. The requirements are that the connection end of the fuel pipe 40 is placed between the pipe connecting member 26 and the conductive outer layer contact parts 23 and that the conductive outer layer contact parts 23 come into contact with the conductive outer layer 45 of the fuel pipe 40. This configuration provides the additional advantageous effects of increasing the contact area and ensuring the electrical connection.

What is claimed is:
1. A fuel supply system configured to supply fuel ejected from a fuel nozzle to a fuel tank, the fuel supply system comprising:
   a resin filler neck extending axially and configured to have a multi-layered structure including an innermost conductive layer of electrical conductivity and an outermost non-conductive of non-electrical conductivity, a conductive outer contact layer contact part extending radially from the innermost conductive layer through and beyond the outermost non-conductive layer of the filler neck, one end with an opening through which the fuel nozzle is inserted, and another end with a pipe connecting member, the pipe connecting member having a fir tree shape including a plurality of radially extending projections each having a cross section configured to grasp and hold another object;

a resin fuel pipe having an end axially connected with the filler neck and configured to have a multi-layered structure including a conductive outer layer of electrical conductivity provided as an outermost layer; and a cap member of electrical conductivity configured to open and close the opening of the filler neck, wherein the filler neck includes a cap member contact part of electrical conductivity arranged to come in contact with the cap member and the conductive outer layer contact part of the filler neck extends radially beyond the axially connected end of the fuel pipe and terminates in a hook-shaped end arranged to contact with the conductive outer layer of the fuel pipe and form a conductive path from the cap member to the conductive outer layer of the fuel pipe, and the pipe connecting member of the filler neck and the axially connected end of the fuel pipe are fitted together with the axially connected end of the fuel pipe being sandwiched between the hook-shaped end of the conductive outer contact layer contact part of the filler neck and at least one of the radially extending projections of the pipe connecting member of the filler neck having the fir tree shape.

2. The fuel supply system according to claim 1, wherein the cap member contact part is formed in a columnar shape.

3. The fuel supply system according to claim 1, wherein the radially extending projections of the pipe connecting member of the filler neck have a cross section corresponding to a right triangle.

4. A fuel supply system configured to supply fuel ejected from a fuel nozzle to a fuel tank, the fuel supply system comprising:

a resin filler neck extending axially and configured to have a multi-layered structure including an innermost non-conductive layer of electrical non-conductivity and an outermost conductive layer of electrical conductivity, one end with an opening through which the fuel nozzle is inserted, and another end with a pipe connecting member, the pipe connecting member having a fir tree shape including a plurality of radially extending projections each having a cross section configured to grasp and hold another object;

a resin fuel pipe having an end axially connected with the filler neck and configured to have a multi-layered structure including a conductive outer layer of electrical conductivity provided as an outermost layer; and a cap member of electrical conductivity and configured to open and close the opening of the filler neck, wherein the filler neck includes a cap member contact of electrical conductivity extending from the conductive layer and passing through the non-conductive layer of the filler neck and into contact with the cap member and the conductive outer layer contact part of the filler neck extends radially from the pipe connecting member of the filler neck and terminates in a hook-shaped end arranged to contact with the conductive outer layer of the fuel pipe and form a conductive path from the cap member to the conductive outer layer of the fuel pipe, and the pipe connecting member of the filler neck and the axially connected end of the fuel pipe are fitted together with the axially connected end of the fuel pipe being sandwiched between the hook-shaped end of the conductive outer contact layer contact part of the filler neck and at least one of the radially extending projections of the pipe connecting member of the filler neck having the fir tree shape.

5. The fuel supply system according to claim 4, wherein the cap member contact, part is formed in a columnar shape.

6. The fuel supply system according to claim 4, wherein the radially extending projections of the pipe connecting member of the filler neck have a cross section corresponding to a right triangle.

* * * * *